Sept. 2, 1952     C. P. YOUNG     2,609,226
STRAIGHT BORE HYDRAULIC KNUCKLE
Original Filed Oct. 24, 1944     4 Sheets-Sheet 1
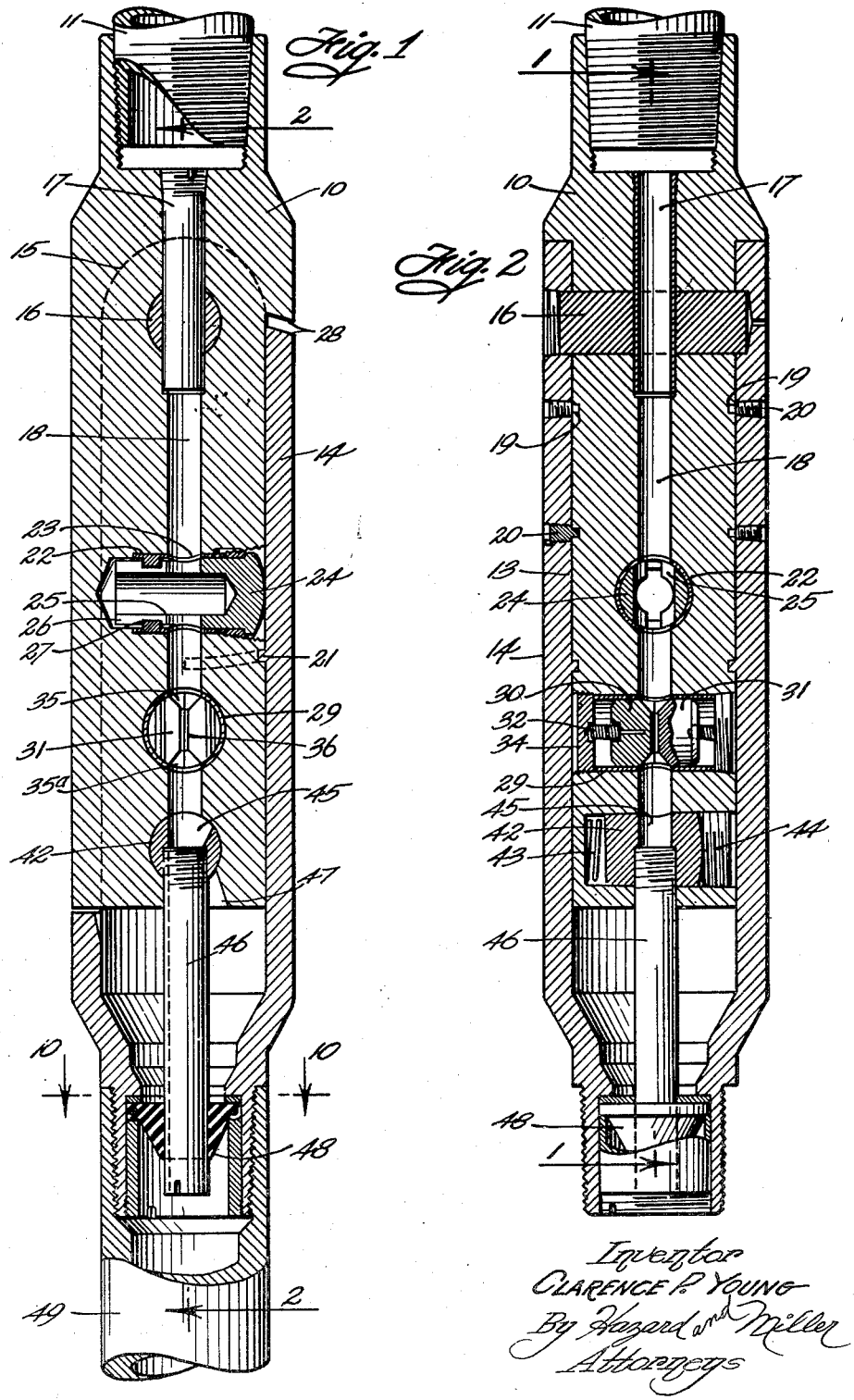
Inventor
CLARENCE P. YOUNG
By Hazard and Miller
Attorneys Sept. 2, 1952     C. P. YOUNG     2,609,226
STRAIGHT BORE HYDRAULIC KNUCKLE
Original Filed Oct. 24, 1944     4 Sheets-Sheet 2
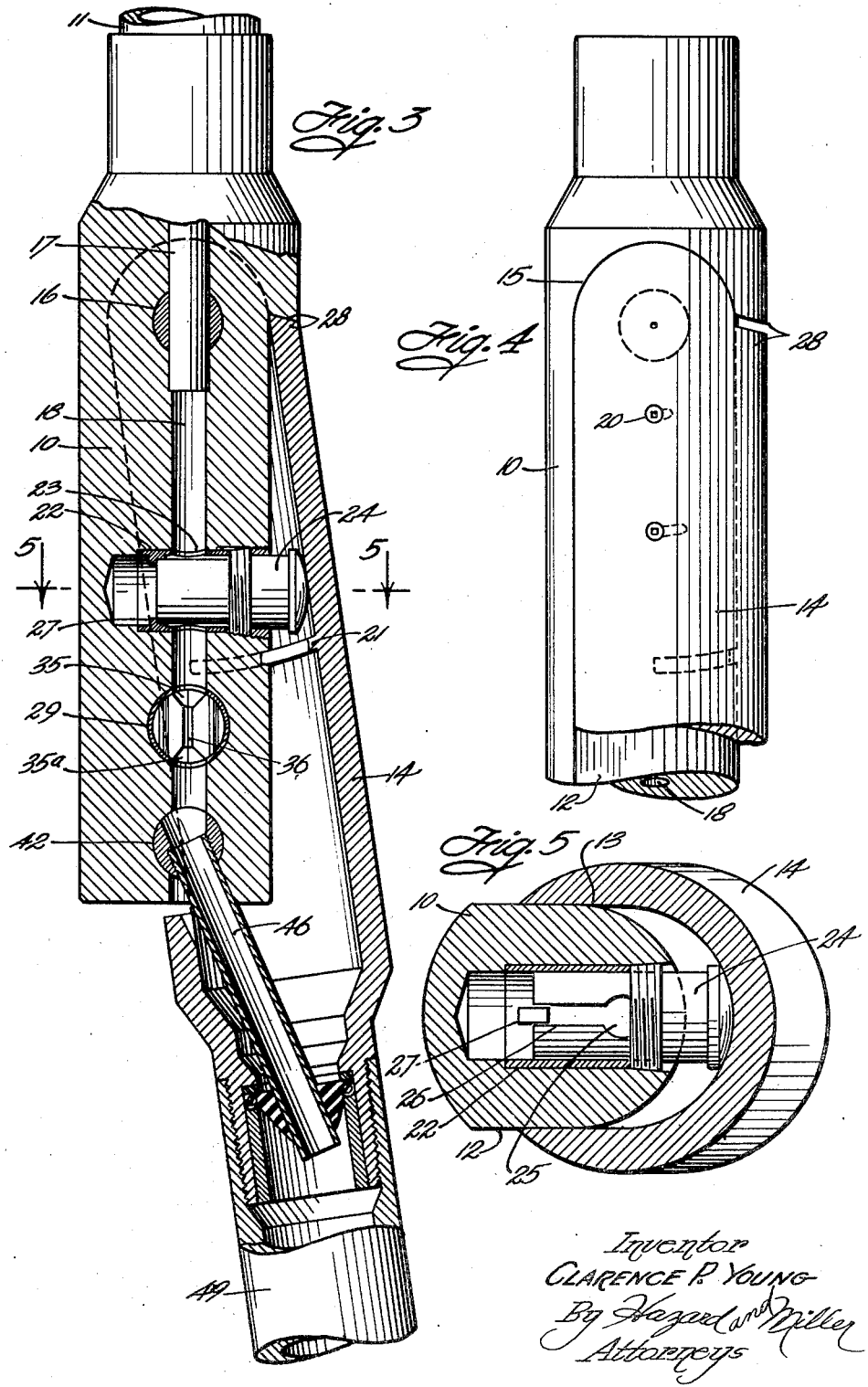
Inventor
CLARENCE P. YOUNG
By Hazard and Miller
Attorneys Sept. 2, 1952 — C. P. YOUNG — 2,609,226
STRAIGHT BORE HYDRAULIC KNUCKLE
Original Filed Oct. 24, 1944 — 4 Sheets-Sheet 3
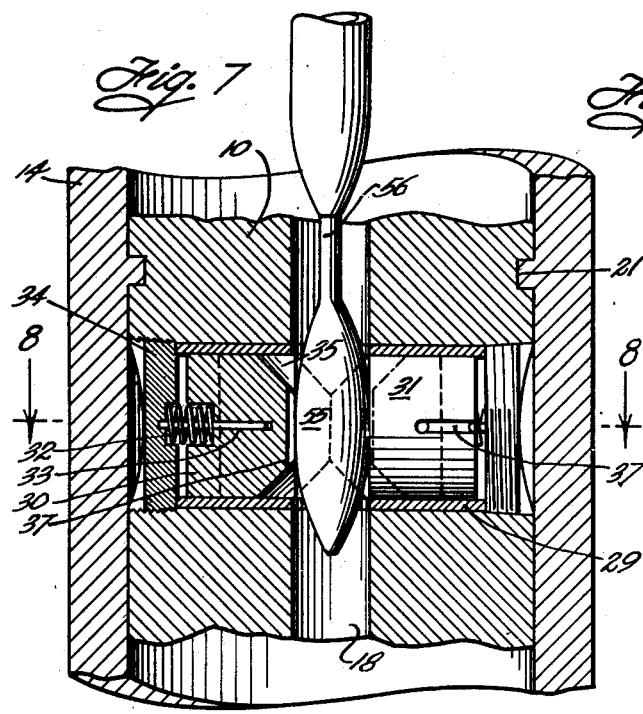
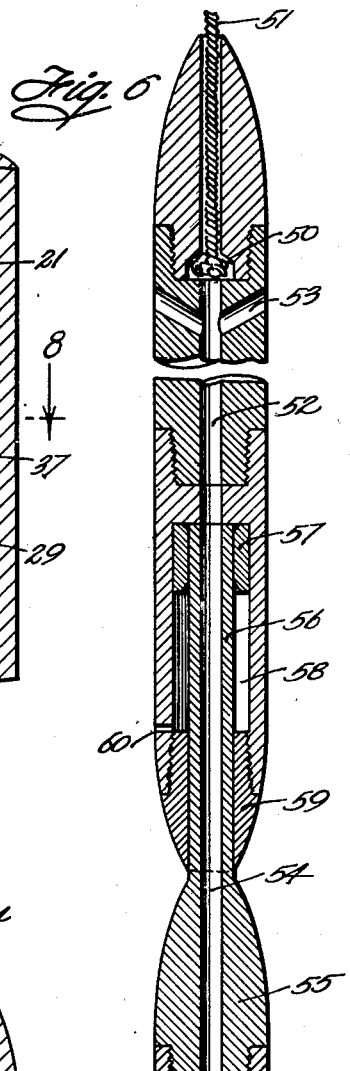
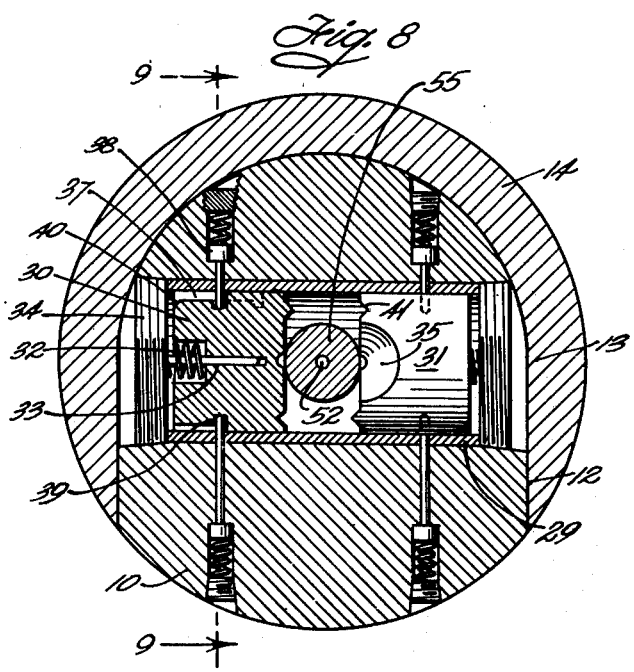
Inventor
CLARENCE P. YOUNG
By Hazard and Miller
Attorneys

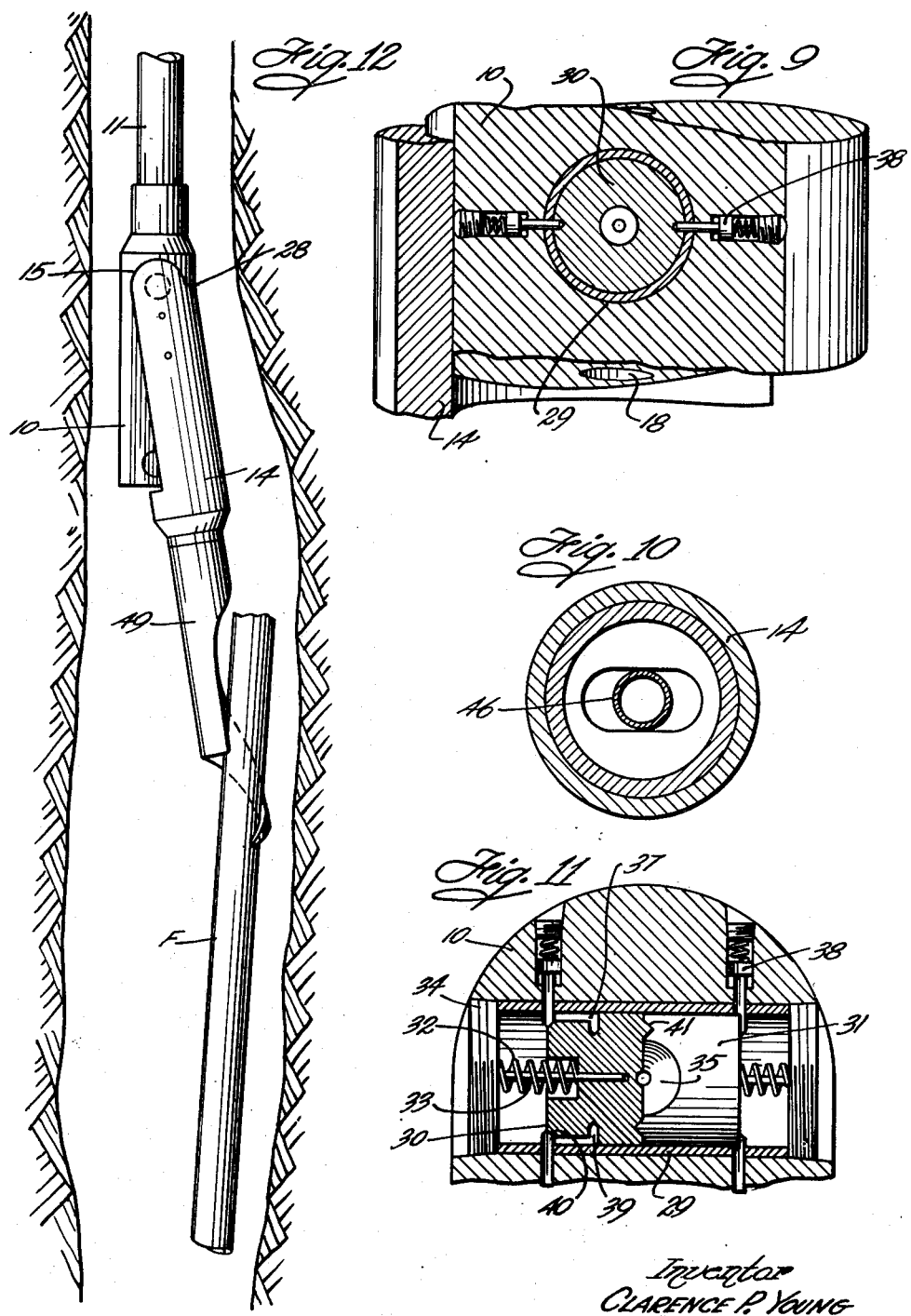

Patented Sept. 2, 1952

2,609,226

UNITED STATES PATENT OFFICE 2,609,226

STRAIGHT BORE HYDRAULIC KNUCKLE

Clarence P. Young, Bellflower, Calif.

Continuation of application Serial No. 560,167, October 24, 1944. This application March 8, 1947, Serial No. 733,335

13 Claims. (Cl. 294—86)

This invention relates to fishing tools for use in wells, and particularly to that class of fishing tool designed to recover lost strings of drill pipe and the like, generally referred to in the art as hydraulic knuckles. This application is a continuation filed in substitution for my co-pending application, Serial No. 560,167, filed October 24, 1944, now abandoned.

A primary object of the invention is to provide an improved hydraulic knuckle which is attachable to a run-in string of pipe and carrying a pivoted arm that is adapted to be forced laterally by hydraulic pressure supplied within the run-in string of pipe and wherein provision is made for establishing a straight continuous bore through the device to enable various operations to be performed after the fish has been engaged.

More specifically, an object of the invention is to provide an improved hydraulic knuckle employing a hydraulically actuated arm wherein provision is made for bearing back fluid that is forced downwardly through the device to develop the requisite back pressure to hydraulically swing the arm laterally with respect to the run-in string of pipe and provision is made for opening the bean after the fish has been engaged to thus form a large straight bore of substantially uniform diameter which will facilitate the discharge of circulation fluid downwardly through or around the fish and which will enable other operations to also be performed therethrough.

With the foregoing and other objects in view, which will be made manifest in the following detailed description and specifically pointed out in the appended claims, reference is had to the accompanying drawings for an illustrative embodiment of the invention, wherein:

Figure 1 is a vertical section through the improved hydraulic knuckle illustrating it in its normal position;

Fig. 2 is a vertical section taken substantially upon the line 2—2 upon Fig. 1;

Fig. 3 is a view similar to Fig. 1, but illustrating the knuckle in that position wherein the arm is swung laterally to engage the fish;

Fig. 4 is a partial view in side elevation of the knuckle shown in Fig. 1;

Fig. 5 is a horizontal section taken substantially upon the line 5—5 upon Fig. 3;

Fig. 6 is a vertical section through a tool that may be effectively employed to open the bean of the device after the fish has been engaged;

Fig. 7 is a partial vertical section illustrating a portion of Fig. 2 on an enlarged scale and illustrating the manner in which the tool illustrated in Fig. 6 is utilized to open the bean;

Fig. 8 is a horizontal section taken substantially upon the line 8—8 of Fig. 7;

Fig. 9 is a partial vertical section taken substantially upon the line 9—9 upon Fig. 8;

Fig. 10 is a horizontal section taken substantially upon the line 10—10 upon Fig. 1;

Fig. 11 is a partial horizontal section similar to Fig. 8 but illustrating the parts of the bean in closed position; and Fig. 12 is a view in side elevation illustrating the manner in which the tool is used.

Referring to the accompanying drawings wherein similar reference characters designate similar parts throughout, the improved hydraulic knuckle comprises a body 10 internally threaded at its upper end for attachment to a run-in string of pipe indicated at 11. The sides of the body are flat as indicated at 12, see Fig. 8, so as to have the sides 13 of an arm 14 slidable thereagainst. The upper end of this arm which is of general U-shaped cross section is equipped with ears 15 to receive a pivot pin 16 by which the arm may pivot and swing laterally with respect to the body as shown in Fig. 12. This pin is locked in position within the body by a tube 17 which extends downwardly within a central bore 18 and which extends through the pivot pin. On the sides of the body there are arcuate grooves 19 which receive the inner ends of threaded studs 20. These studs are designed to assist in carrying the weight and function as safety devices for holding the parts of the tool together in the event that the pivot pin 16 should break under severe stress or jarring.

Additional ribs 21 may be formed on the interior of the arm and be slidable in complementary grooves on the exterior of the body for this purpose. To actuate the arm with relation to the body a bushing 22 extends transversely within the body, this bushing having apertures 23 in registry with the bore 18. Within this bushing there is slidable a hollow plunger 24, the head of which bears against the interior of the arm 14. The walls of this hollow plunger have apertures 25 that are normally in registration with the bore 18 and these apertures in turn communicate with slots 26 into which lugs 27 on the bushing extend. The lugs thus form keys that are slidable in the slots 26 enabling the plunger 24 to slide within the bushing from the position shown in Fig. 1 to the position shown in Fig. 3, but hold the plunger against rotation within the bushing. Consequently, regardless of the position assumed by the plunger 24 there is constant communication between bore 18 and the interior of the plunger. In the position shown in Fig. 1 this communication is established by means of the apertures 25 which are of substantially the same diameter as the bore 18 and in the position shown in Fig. 3 communication is established through the slots 26. Opposed shoulders 28 are provided on the body and the arm and are mutually engageable with each other to limit outward swinging movement of the arm relative to the body. Outward swinging movement of the arm is limited to a position such that the plunger 24 can not be forced entirely out of the bushing.

Below bushing 22 bore 18 is traversed by a second bushing 29 having apertures in the top and bottom thereof registering with the bore and within this bushing there is disposed an expansible bean the parts of which are indicated at 30 and 31. These parts of the bean are urged into opposition with each other by means of coil compression springs 32 arranged around guide stems 33 that are mounted on threaded plugs 34 that are screwed into the body and which maintain the bushing 29 in place. The opposed faces of the parts 30 and 31 are counterbored at top and bottom as indicated at 35 and 35a, and intermediate these counterbored portions there are formed semi-cylindrical recesses 36 which mutually cooperate to form a relatively small passage through the bean when the parts of the bean are mutually engaged, as indicated in Fig. 2. This small passage is materially smaller than the diameter of the bore 18 and serves by means of its resistance to flow to create a back pressure in bore 18 thereabove so as to develop within the bore sufficient pressure to cause the plunger 24 to be actuated when fluid, such as circulation fluid, is pumped downwardly through the run-in string of pipe 11. The sides of the parts 30 and 31 of the bean are equipped with grooves 37 and spring actuated locking pins or plungers 38 are mounted in the body and extend through the walls of the bushing 29 and into these grooves. The inner ends of the grooves are formed with recesses 39 into which the locking pins may be sprung by means of their springs. The outer ends of the grooves may be equipped with bevelled portions 40 against which the inner ends of the locking pins may bear when the parts of the bean are in mutual engagement. The parts of the bean may be formed with opposed ribs and grooves 41 adapted to fit together when the parts of the bean are mutually engaged.

Below bushing 29 bore 18 is traversed by a short rockshaft 42 urged by a spring 43 against a threaded plug 44. This rockshaft has a slotted opening 45 formed in its upper end so that in all rotary positions assumed by it this opening may remain in communication with the lower end of bore 18. A discharge tube 46 is threaded into this rockshaft and extends downwardly therefrom. This discharge tube has an internal diameter substantially equal to that of the bore 18. The bottom of the body is cut away as indicated at 47 to accommodate lateral swinging movement of the discharge tube. The lower end of the arm 14 extends forwardly beneath the bottom of the body and has mounted therein a rubber bushing 48 through which the lower end of the discharge tube slidably extends. This bushing is preferably formed of good elastic rubber as it is required to be deformed from its normal position into the position shown in Fig. 3. The lower end of the arm is threaded for attachment of a wall hook 49 or its equivalent so that it may engage a lost string of drill pipe indicated on Fig. 12. As an accessory to the tool a type of go-devil is employed, such as is illustrated in Fig. 6. This go-devil is adapted to be lowered through the run-in string of pipe 11 and to enter the bore 18. At its upper end it is provided with a suitable rope socket 50 providing for attachment to a cable 51. In the body there is formed a central bore 52 communicating with lateral ports 53 at the top thereof and the lower end of this bore communicates with a bore 54 in a lower head 55. The upper end of this head carries a stem 56 on which is formed a cap or shoulder 57. This cap or shoulder is reciprocable in a cylinder 58 closed at its lower end by a secondary head 59. The cylinder is vented as at 60.

The operation and advantages of the improved hydraulic knuckle are as follows: When it is desired to engage and recover a fish F the knuckle is attached to a run-in string of pipe 11 and lowered into the well to the approximate location of the fish. During this lowering operation the parts 30 and 31 of the expansible bean are in mutual engagement with each other thus providing only a small passage therethrough for the downward flow of circulation fluid. Circulation fluid is then pumped into the run-in string of pipe 11 and is forced downwardly into bore 18. As downward flow through the bean is greatly restricted, pressure is developed within the bore which is transmitted to the interior of plunger 24. Plunger 24 is forced outwardly thus swinging arm 14 into position shown in Figs. 3 and 12. The wall hook or the equivalent that may be mounted on the arm can then be caused to sweep against the walls of the well hole on rotation of the run-in string of pipe and may be caused to engage the fish F which may be leaning against the well walls. After the fish has been engaged by the wall hook an upward strain may be taken on the run-in string of pipe in an endeavor to recover the fish. Usually, however, the fish has become so lodged in the well that its recovery can not be had immediately. Pressure may then be turned off and the arm 14 permitted to resume its normally vertical position. The go-devil illustrated in Fig. 6 may then be lowered in the run-in string of pipe 11 by means of cable 51. This go-devil will enter the bore 18 and its head 55 becomes seated in the counterbored upper portions 35 of the parts of the expansible bean. By raising and lowering the cable 51 the upper portion of the go-devil may function as a type of jar pounding on the cap or shoulder 57 and thus forcing head 55 downwardly between the parts 30 and 31 of the expansible bean. The locking pins 38 will thus be crowded outwardly by means of the bevels 40 allowing the parts 30 and 31 to expand and be locked in expanded position by the locking pins 38 entering the recesses 39. In this manner the expansible bean is expanded so that the passage afforded by bore 18 is no longer restricted. The go-devil may then be removed from the tool and circulation may be resumed. The circulation fluid can consequently be caused to flow downwardly through bore 18 and through the discharge pipe 46 and be caused to discharge downwardly through or around the fish F. Frequently the establishing of such circulation through the fish will loosen it to enable its recovery. In the event, however, that circulation or jarring of the tool is insufficient to loosen the fish it is possible by means of the present construction to lower through bore 18 which has thus been opened by the expansible bean an explosive and cause it to be exploded in the fish to loosen it and thus enable its recovery.

Various other operations may also be performed through the device inasmuch as the bean has been fully opened and locked in open position after it has served its purpose of creating sufficient back pressure to cause the plunger 24 to accommodate the arm 14.

From the above-described construction it will be appreciated that a novel, advantageous improved hydraulic knuckle is provided which enables the creation of sufficient back pressure to accommodate the arm 14 and which after the fish has been engaged provides a straight, continuous bore therethrough of uniformly large diameter which will enable various operations to be performed through the tool to assure loosening and recovery of the fish F.

Various changes may be made in the details of construction without departing from the spirit and scope of the invention as defined by the appended claims.

I claim:

1. A well fishing tool comprising a body attachable to a run-in string of pipe, said body having a straight passage therethrough for the discharge of fluid, means for beaning back the fluid in said passage to develop a pressure therein, an arm pivotally mounted upon said body, means responsive to the beaned back pressure for swinging the arm relatively to the body, said beaning means being openable, and means for locking the beaning means in fully open position.

2. A well fishing tool comprising a body attachable to a run-in string of pipe, said body having a straight passage therethrough for the discharge of fluid, means for beaning back the fluid in said passage to develop a pressure therein, an arm pivotally mounted upon said body, means responsive to the beaned back pressure for swinging the arm relatively to the body, said beaning means being openable, means for locking the beaning means in fully open position, and means for conducting fluid discharged through said passage from said body through said arm.

3. A well fishing tool comprising a body attachable to a run-in string of pipe, said body having a passage therethrough for circulation fluid, an arm hingedly mounted upon said body for movement laterally with respect thereto, pressure-responsive means responsive to pressure in said passage for moving said means laterally relatively to the body, an openable bean in said passage below said pressure-responsive means, means for locking the openable bean in open position, and a wash pipe pivotally connected to the body for movement about an axis parallel to the axis of rotation of said arm, and means providing a deformable bushing on the arm about the wash pipe.

4. A well fishing tool comprising a body attachable to a run-in string of pipe, an arm, a pivot pin for pivotally mounting said arm upon the body, a piston in the body operable to swing the arm laterally relatively to the body, there being a straight passage formed through the body, pivot pin and piston, means providing a bean in the body below the piston adapted when in contracted position to build up a back pressure to be effective on the piston, means for locking the bean in fully open position to permit free flow of liquid through said passage, a wash pipe pivotally mounted upon the body for rotation about an axis parallel to the pivot pin and in communication with said passage below the bean and means providing a deformable seal between said wash pipe and said arm.

5. In a well fishing tool, a body attachable to a run-in string of pipe, said body having a vertical passage therethrough, an arm pivotally mounted upon the body, there being a cylinder formed in the body transverse with respect to said passage and open toward said arm, a piston in said cylinder, said piston having a head engageable with the arm and an open ended skirt, said skirt having apertures therethrough adapted to register with said vertical passage.

6. In a fishing tool, a body, an arm pivotally mounted thereon, there being a passage for circulation fluid in the body, a piston responsive to pressure in said passage for actuating the arm to cause it to swing relative to the body, said piston having a passage therethrough forming a continuation therethrough of the passage in the body, and means permitting the piston to respond to pressure in the passage but preventing rotation of the piston within the body whereby the passage through the piston may not become disaligned from the passage in the body.

7. In a fishing tool, a body having a circulation fluid passage therethrough, an arm pivotally mounted upon the body for swinging movement relatively thereto, fluid pressure responsive means responsive to pressure in the circulation fluid passage for swinging the arm relative to the body, a pair of opposed bean-forming members below said fluid pressure responsive means adapted to cooperate to restrict flow through the circulation fluid passage or to be moved into retracted positions to more fully open said passage, and means for locking said members in retracted positions.

8. In a fishing tool, a body having a circulation fluid passage therethrough, an arm pivotally mounted upon the body for swinging movement relatively thereto, fluid pressure responsive means responsive to pressure in the circulation fluid passage for swinging the arm relative to the body, means for choking or opening said passage, means normally urging said means into passage-choking position, means for locking said means in passage-opening position, and means adapted to be passed downwardly through said passage to engage said choking means to shift the same from choking to passage-opening position.

9. In a fishing tool, a body having a straight circulation fluid passage, an arm pivotally connected to the body for swinging movement relative thereto, a plunger reciprocable in the body adapted to be forced outwardly by pressure in said passage to swing the arm outwardly relative to the body, means below said plunger for choking said passage or opening it, and means having a longitudinal passage for the passage of circulation fluid therethrough adapted to be passed downwardly through the circulation fluid passage to engage the choking means and shift it from choking to open position.

10. In a fishing tool, a body having a straight circulation fluid passage, an arm pivotally connected to the body for swinging movement relative thereto, a plunger reciprocable in the body adapted to be forced outwardly by pressure in said passage to swing the arm outwardly relative to the body, means below said plunger for choking said passage or opening it, means having a longitudinal passage for the passage of circulation fluid therethrough adapted to be passed downwardly through the circulation fluid passage to engage the choking means and shift it from choking to open position, and means for locking the choking means in open position after having been thus shifted.

11. In a fishing tool, a body having a straight circulation fluid passage, an arm pivotally connected to the body for swinging movement relative thereto, a plunger reciprocable in the body adapted to be forced outwardly by pressure in said passage to swing the arm outwardly relative to the body, means below said plunger for choking said passage or opening it, means having a longitudinal passage for the passage of circulation fluid therethrough adapted to be passed downwardly through the circulation fluid passage to engage the choking means and shift it from choking to open position, and a wash pipe pivotally connected to said body below said choking means forming a continuation of said passage leading to said arm.

12. In a fishing tool, a body having a straight circulation fluid passage, an arm pivotally connected to the body for swinging movement relative thereto, a plunger reciprocable in the body adapted to be forced outwardly by pressure in said passage to swing the arm outwardly relative to the body, means below said plunger for choking said passage or opening it, means having a longitudinal passage for the passage of circulation fluid therethrough adapted to be passed downwardly through the circulation fluid passage to engage the choking means and shift it from choking to open position, a wash pipe pivotally connected to said body below said choking means forming a continuation of said passage leading to said arm, and means providing a seal between said wash pipe and said arm.

13. In a fishing tool, a body having a straight circulation fluid passage, an arm pivotally connected to the body for swinging movement relative thereto, a plunger reciprocable in the body adapted to be forced outwardly by pressure in said passage to swing the arm outwardly relative to the body, means below said plunger for choking said passage or opening it, means having a longitudinal passage for the passage of circulation fluid therethrough adapted to be passed downwardly through the circulation fluid passage to engage the choking means and shift it from choking to open position, and a wash pipe pivotally connected to said body and having a sealed connection with said arm, said wash pipe being so arranged that when the arm is in its collapsed position with relation to the body that the wash pipe hangs vertically from said body and forms a straight continuation of said straight circulation fluid passage.

CLARENCE P. YOUNG.

REFERENCES CITED

The following references are of record in the file of this patent:

UNITED STATES PATENTS

| Number | Name | Date |
|---|---|---|
| 218,052 | Neath | July 29, 1879 |
| 586,841 | Drew | July 20, 1897 |
| 1,696,378 | Brauer | Dec. 25, 1928 |
| 1,718,771 | Baker | June 25, 1929 |
| 1,800,490 | Young | Apr. 14, 1931 |
| 2,169,502 | Santiago | Aug. 15, 1939 |
| 2,242,279 | Young | May 20, 1941 |
| 2,333,802 | Lowrey | Nov. 9, 1943 |